US010000875B2

(12) United States Patent
Davis et al.

(10) Patent No.: US 10,000,875 B2
(45) Date of Patent: Jun. 19, 2018

(54) WASHING MACHINE APPLIANCE OUT-OF-BALANCE DETECTION

(71) Applicant: General Electric Company, Schenectady, NY (US)

(72) Inventors: Paul Owen Davis, Prospect, KY (US); David Scott Dunn, Smithfield, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 113 days.

(21) Appl. No.: 15/099,709

(22) Filed: Apr. 15, 2016

(65) Prior Publication Data

US 2017/0298554 A1 Oct. 19, 2017

(51) Int. Cl.
*D06F 35/00* (2006.01)
*D06F 37/12* (2006.01)
*D06F 37/20* (2006.01)
*D06F 39/08* (2006.01)
*G01M 1/16* (2006.01)

(52) U.S. Cl.
CPC .......... *D06F 37/203* (2013.01); *D06F 35/005* (2013.01); *D06F 37/12* (2013.01); *D06F 39/088* (2013.01); *G01M 1/16* (2013.01)

(58) Field of Classification Search
CPC ...... D06F 35/005; D06F 37/12; D06F 37/203; D06F 39/088; G01M 1/16

USPC ............... 8/158, 159; 68/12.02, 12.06, 12.27
See application file for complete search history.

(56) References Cited

U.S. PATENT DOCUMENTS

| | | | | |
|---|---|---|---|---|
| 2006/0130242 A1* | 6/2006 | Hoppe | ..................... | D06F 33/02 8/158 |
| 2006/0242769 A1* | 11/2006 | Borras | .................. | D06F 37/203 8/159 |
| 2007/0050919 A1* | 3/2007 | Koo | ...................... | D06F 35/007 8/158 |
| 2010/0236295 A1* | 9/2010 | Volpato, Jr. | ........... | D06F 37/203 68/12.06 |

* cited by examiner

*Primary Examiner* — Levon J Shahinian
(74) *Attorney, Agent, or Firm* — Dority & Manning, P.A.

(57) ABSTRACT

A method for operating a washing machine appliance includes flowing a volume of liquid into a tub, agitating articles within the tub for a first period, the tub containing the volume of liquid, and measuring movement of the tub during agitation of the articles within the tub, the tub containing the volume of liquid. The movement is measured using an accelerometer and a gyroscope. The method further includes agitating articles within the tub for a second period when the final measured movement is greater than an out-of-balance movement threshold, the tub containing the volume of liquid. The method further includes draining liquid from the tub when the final measured movement is less than the out-of-balance movement threshold, and spinning a basket after draining liquid from the tub.

19 Claims, 5 Drawing Sheets

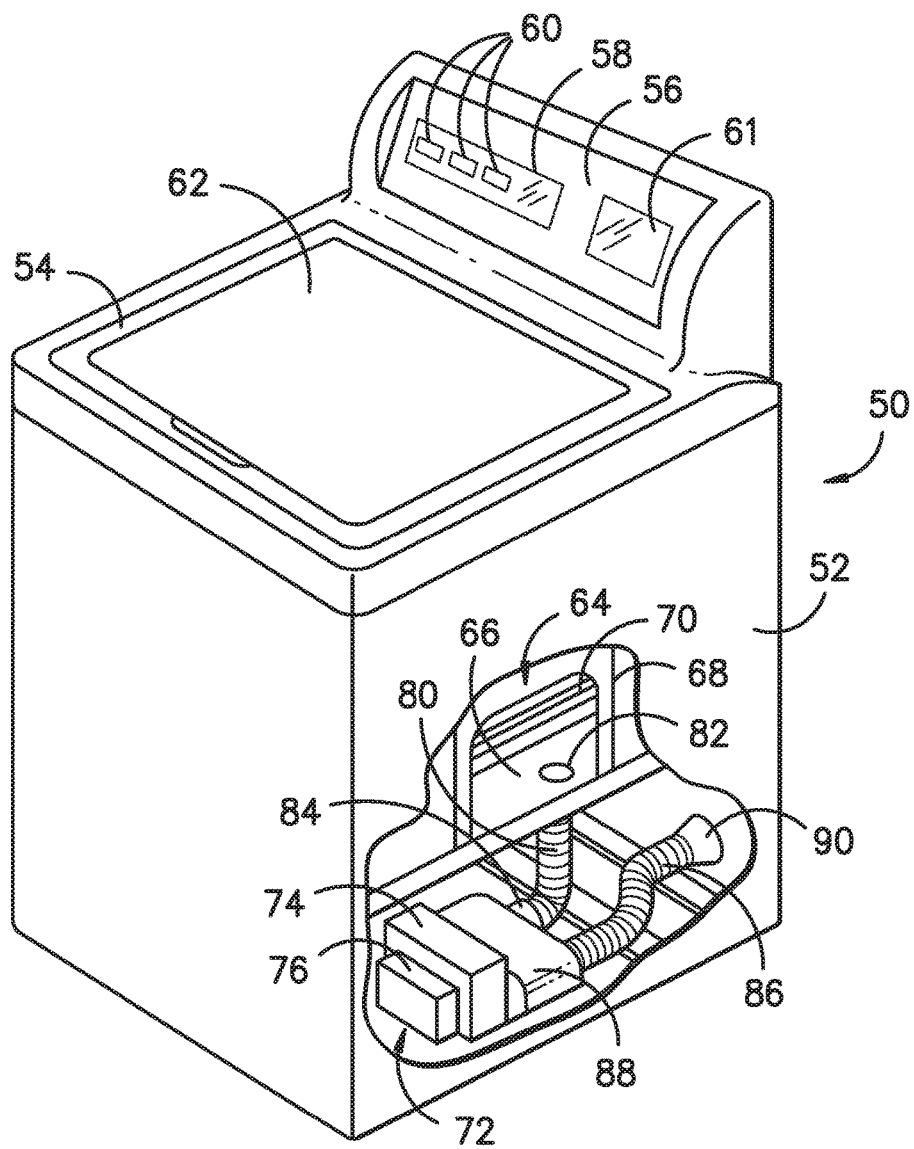
FIG. -1-

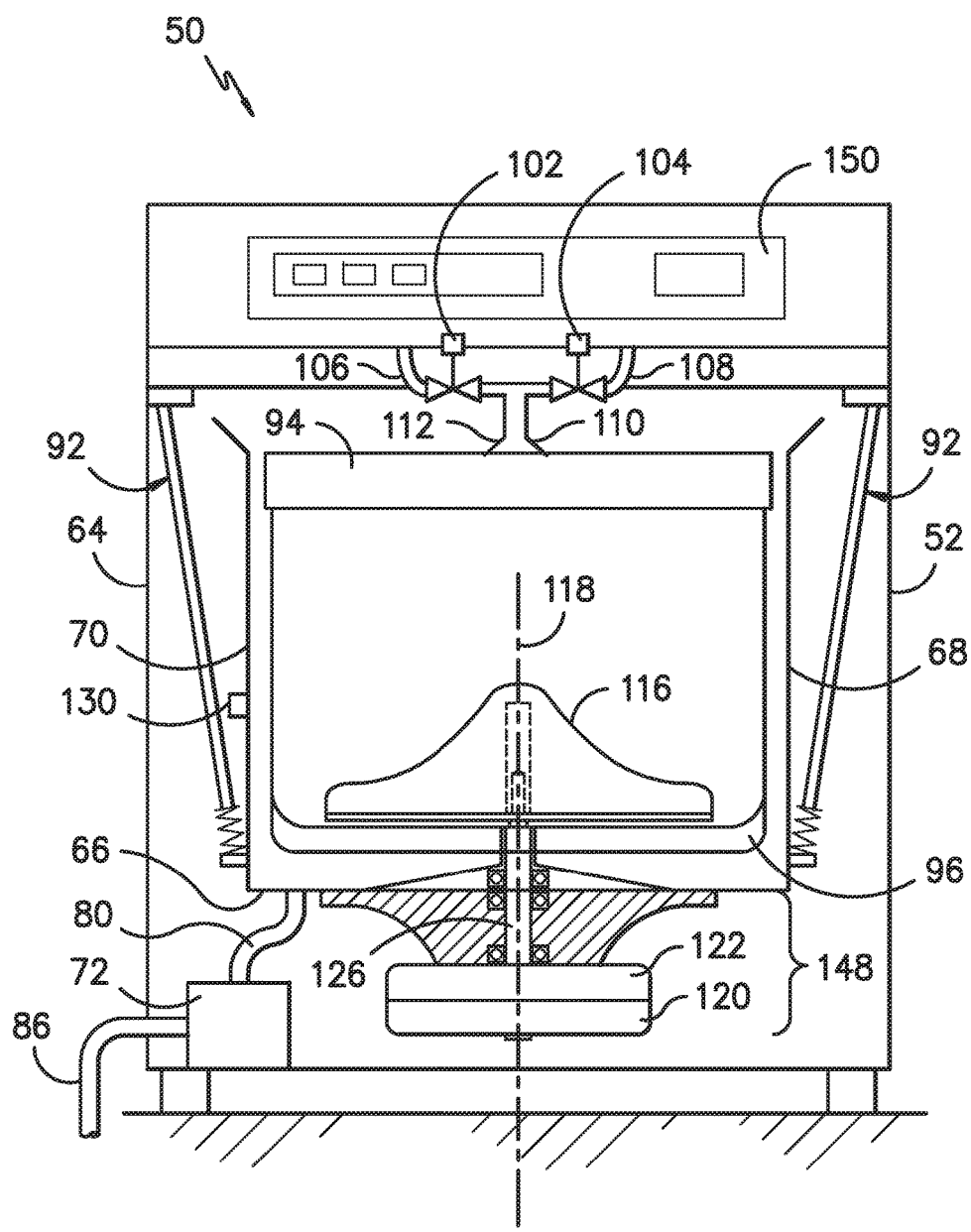
FIG. -2-

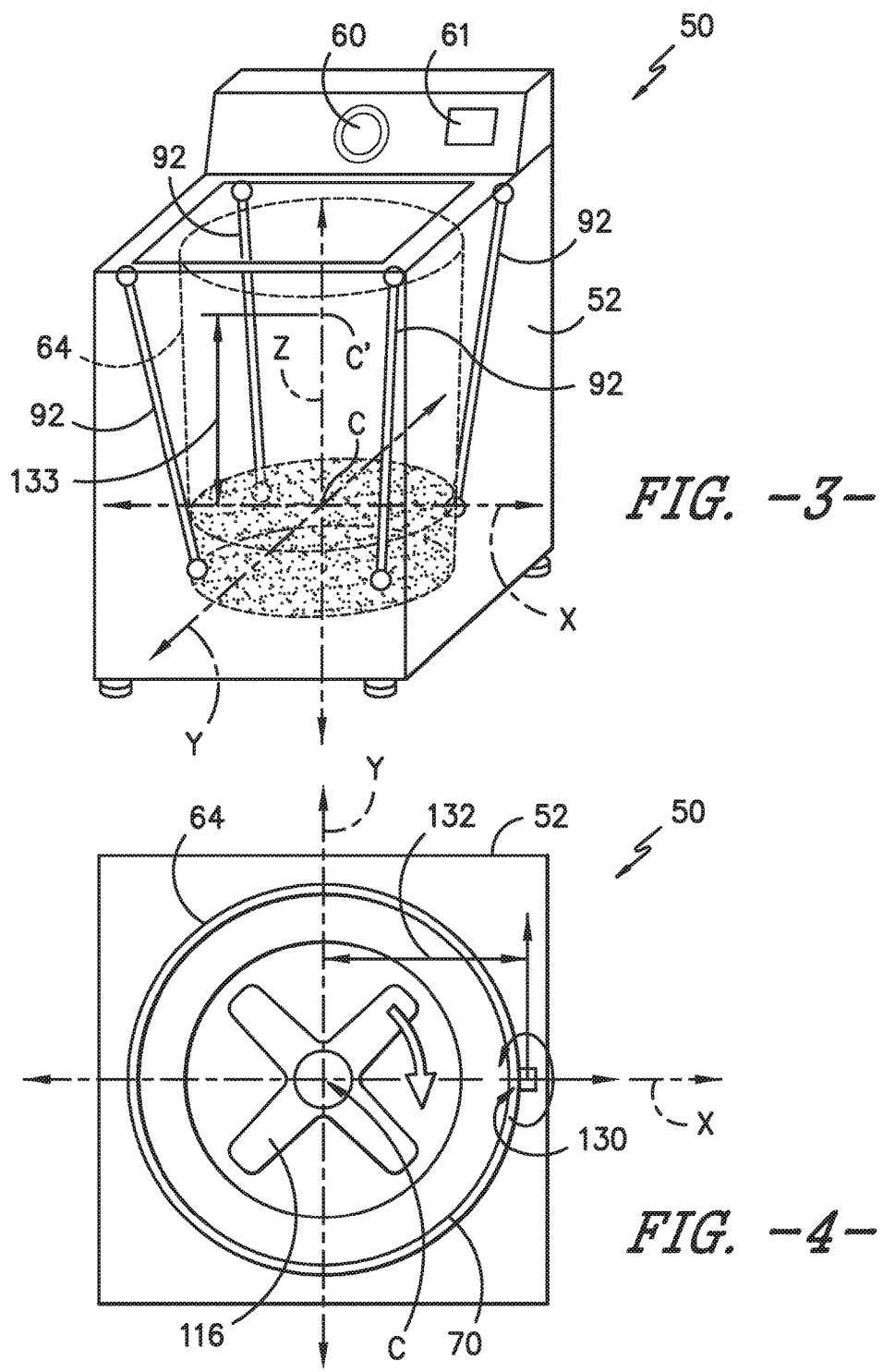

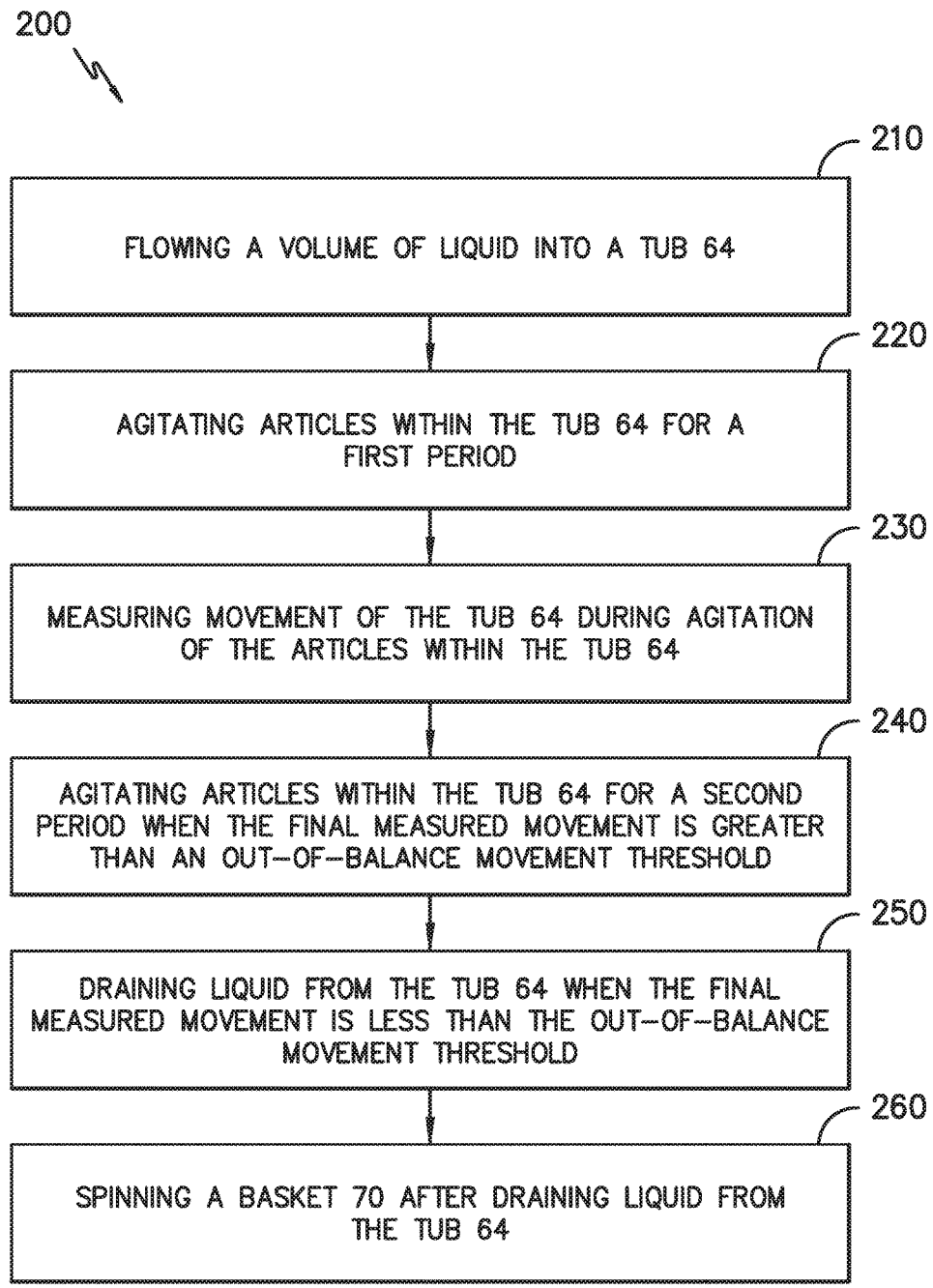
FIG. -5-

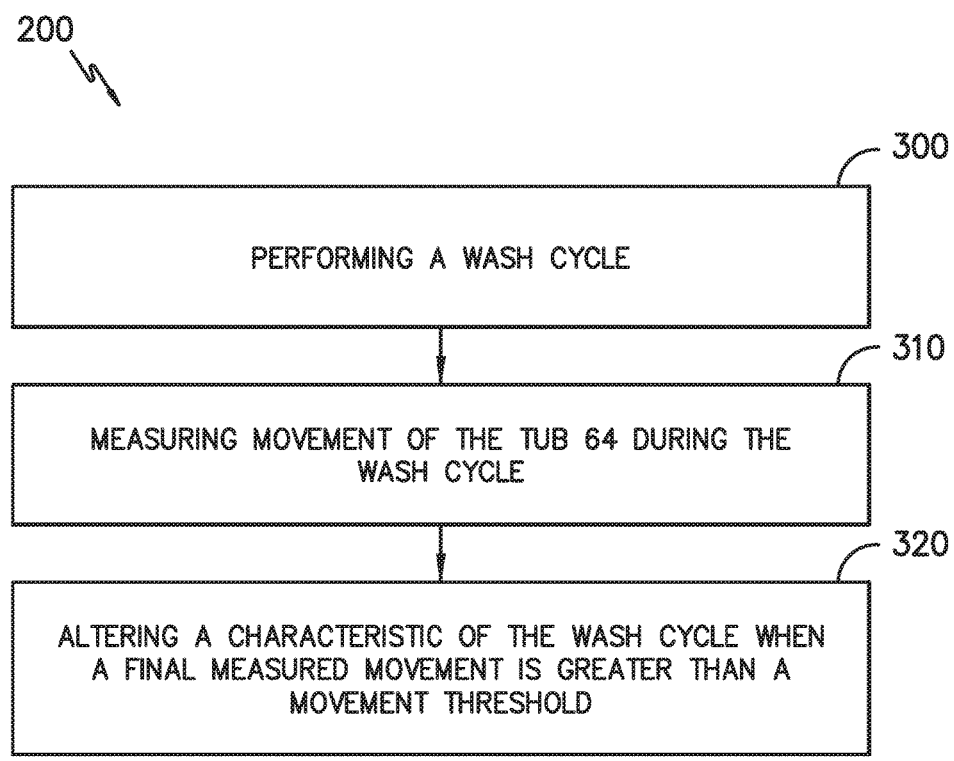
FIG. -6-

# WASHING MACHINE APPLIANCE OUT-OF-BALANCE DETECTION

FIELD OF THE INVENTION

The present subject matter relates generally to washing machine appliances, such as vertical axis washing machine appliances, and methods for monitoring load balance states in such washing machine appliances.

BACKGROUND OF THE INVENTION

Washing machine appliances generally include a cabinet which receives a tub for containing wash and rinse water. A wash basket is rotatably mounted within the wash tub. A drive assembly is coupled to the wash tub and configured to rotate the wash basket within the wash tub in order to cleanse articles within the wash basket. Upon completion of a wash cycle, a pump assembly can be used to rinse and drain soiled water to a draining system.

Washing machine appliances include vertical axis washing machine appliances and horizontal axis washing machine appliances, where "vertical axis" and "horizontal axis" refer to the axis of rotation of the wash basket within the wash tub. Vertical axis washing machine appliances typically have the wash tub suspended in the cabinet with suspension devices. The suspension devices generally allow the tub to move relative to the cabinet during operation of the washing machine appliance.

A significant concern during operation of washing machine appliances is the balance of the tub during operation. This issue is of particular concern for vertical axis washing machine appliances. For example, articles loaded within a basket may not be equally weighted about the central axis of the basket and tub. Accordingly, when the basket rotates, in particular during a spin cycle, the imbalance in clothing weight may cause the basket to be out-of-balance within the tub, such that the central axis of the basket and tub move together in an orbital fashion. Such out-of-balance issues can cause the basket to contact the tub during rotation, and can further cause movement of the tub within the cabinet. Significant movement of the tub can cause the tub to contact the cabinet, potentially causing excessive noise, vibration and/or motion or causing damage to the appliance.

Various methods are known for monitoring load balance of washing machine appliances. However, such methods typically monitor load balance and detect out-of-balance states during the spin cycle, when the basket is spinning at a high rate of speed. Accordingly, noise, vibration, movement or damage may occur despite the out-of-balance detection.

Accordingly, improved methods and apparatus for monitoring load balance in washing machine appliances are desired. In particular, methods and apparatus which provide accurate monitoring and detection at earlier times during the wash cycle would be advantageous.

BRIEF DESCRIPTION OF THE INVENTION

In accordance with one embodiment, a method for operating a washing machine appliance is provided. The washing machine appliance has a tub and a basket rotatably mounted within the tub. The basket defines a chamber for receipt of articles for washing. The method includes performing a wash cycle, the wash cycle including flowing a volume of liquid into the tub, agitating articles within the tub, draining liquid from the tub after agitating the articles, and spinning the basket after draining liquid from the tub. The method further includes measuring movement of the tub during the wash cycle, wherein the movement is measured using an accelerometer and a gyroscope. The method further includes altering a characteristic of the wash cycle when a final measured movement is greater than a movement threshold.

In accordance with another embodiment, a method for operating a washing machine appliance is provided. The washing machine appliance has a tub and a basket rotatably mounted within the tub. The basket defines a chamber for receipt of articles for washing. The method includes flowing a volume of liquid into the tub, agitating articles within the tub for a first period, the tub containing the volume of liquid, and measuring movement of the tub during agitation of the articles within the tub, the tub containing the volume of liquid. The movement is measured using an accelerometer and a gyroscope. The method further includes agitating articles within the tub for a second period when the final measured movement is greater than an out-of-balance movement threshold, the tub containing the volume of liquid. The method further includes draining liquid from the tub when the final measured movement is less than the out-of-balance movement threshold, and spinning the basket after draining liquid from the tub.

In accordance with another embodiment, a washing machine appliance is provided. The washing machine appliance includes a tub, a basket rotatably mounted within the tub, the basket defining a wash chamber for receipt of articles for washing, a valve, a nozzle configured for flowing liquid from the valve into the tub, an agitation element, and a motor in mechanical communication with the basket, the motor configured for selectively rotating the basket within the tub and further configured for selectively rotating the agitation element. The washing machine appliance further includes a gyroscope mounted to the tub, and an accelerometer mounted to the tub. The washing machine appliance further includes a controller in operative communication with the valve and the motor. The controller is configured for flowing a volume of liquid into the tub, agitating articles within the tub for a first period, the tub containing the volume of liquid, and measuring movement of the tub during agitation of the articles within the tub, the tub containing the volume of liquid. The movement is measured using the accelerometer and the gyroscope. The controller is further configured for agitating articles within the tub for a second period when the final measured movement is greater than an out-of-balance movement threshold, the tub containing the volume of liquid. The controller is further configured for draining liquid from the tub when the final measured movement is less than the out-of-balance movement threshold, and spinning the basket after draining liquid from the tub.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of a washing machine appliance, with a portion of a cabinet of the washing machine appliance shown broken away in order to reveal certain interior components of the washing machine appliance, in accordance with embodiments of the present disclosure;

FIG. 2 provides a front elevation schematic view of various components of the washing machine appliance of FIG. 1.

FIG. 3 is a perspective schematic view of components of a washing machine appliance in accordance with embodiments of the present disclosure;

FIG. 4 is a top view of an agitation element, basket, and tub within a cabinet of a washing machine appliance in accordance with embodiments of the present disclosure;

FIG. 5 is a flow chart illustrating a method for operating a washing machine appliance in accordance with embodiments of the present disclosure; and FIG. 6 is a flow chart illustrating another method for operating a washing machine appliance in accordance with embodiments of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view partially broken away of a washing machine appliance 50 according to an exemplary embodiment of the present subject matter. As may be seen in FIG. 1, washing machine appliance 50 includes a cabinet 52 and a cover 54. A backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment a display 61 indicates selected features, a countdown timer, and other items of interest to machine users. A lid 62 is mounted to cover 54 and is rotatable about a hinge (not shown) between an open position (not shown) facilitating access to a wash tub 64 located within cabinet 52, and a closed position (shown in FIG. 1) forming an enclosure over wash tub 64.

As illustrated in FIG. 1, washing machine appliance 50 is a vertical axis washing machine appliance. While the present disclosure is discussed with reference to a vertical axis washing machine appliance, those of ordinary skill in the art, using the disclosures provided herein, should understand that the subject matter of the present disclosure is equally applicable to other washing machine appliances.

Tub 64 includes a bottom wall 66 and a sidewall 68, and a basket 70 is rotatably mounted within wash tub 64. A pump assembly 72 is located beneath tub 64 and basket 70 for gravity assisted flow when draining tub 64. Pump assembly 72 includes a pump 74 and a motor 76. A pump inlet hose 80 extends from a wash tub outlet 82 in tub bottom wall 66 to a pump inlet 84, and a pump outlet hose 86 extends from a pump outlet 88 to an appliance washing machine water outlet 90 and ultimately to a building plumbing system discharge line (not shown) in flow communication with outlet 90.

FIG. 2 provides a front elevation schematic view of certain components washing machine appliance 50 including wash basket 70 movably disposed and rotatably mounted in wash tub 64 in a spaced apart relationship from tub side wall 68 and tub bottom 66. Basket 70 includes a plurality of perforations therein to facilitate fluid communication between an interior of basket 70 and wash tub 64.

A hot liquid valve 102 and a cold liquid valve 104 deliver liquid, such as water, to basket 70 and wash tub 64 through a respective hot liquid hose 106 and a cold liquid hose 108. Liquid valves 102, 104 and liquid hoses 106, 108 together form a liquid supply connection for washing machine appliance 50 and, when connected to a building plumbing system (not shown), provide a fresh water supply for use in washing machine appliance 50. Liquid valves 102, 104 and liquid hoses 106, 108 are connected to a basket inlet tube 110, and liquid is dispersed from inlet tube 110 through a nozzle assembly 112 having a number of openings therein to direct washing liquid into basket 70 at a given trajectory and velocity. A dispenser (not shown in FIG. 2), may also be provided to produce a liquid or wash solution by mixing fresh water with a known detergent and/or other additive for cleansing of articles in basket 70.

Referring now to FIGS. 2 through 4, an agitation element 116, such as a vane agitator, impeller, auger, or oscillatory basket mechanism, or some combination thereof is disposed in basket 70 to impart an oscillatory motion to articles and liquid in basket 70. In various exemplary embodiments, agitation element 116 may be a single action element (oscillatory only), double action (oscillatory movement at one end, single direction rotation at the other end) or triple action (oscillatory movement plus single direction rotation at one end, single direction rotation at the other end). As illustrated, agitation element 116 is oriented to rotate about a vertical axis 118.

Basket 70 and agitation element 116 are driven by a motor 120 through a transmission and clutch system 122. The motor 120 drives shaft 126 to rotate basket 70 within wash tub 64. Clutch system 122 facilitates driving engagement of basket 70 and agitation element 116 for rotatable movement within wash tub 64, and clutch system 122 facilitates relative rotation of basket 70 and agitation element 116 for selected portions of wash cycles. Motor 120 and transmission and clutch system 122 collectively are referred herein as a motor assembly 148.

Basket 70, tub 64, and machine drive system 148 are supported by a vibration dampening suspension system. The dampening suspension system can include one or more suspension assemblies 92 coupled between and to the cabinet 52 and wash tub 64. Typically, four suspension assemblies 92 are utilized, and are spaced apart about the wash tub 64. For example, each suspension assembly 92 may be connected at one end proximate a corner of the cabinet 52 and at an opposite end to the wash tub 64. The washer can include other vibration dampening elements, such as a balance ring 94 disposed around the upper circumferential surface of the wash basket 70. The balance ring 94 can be used to counterbalance an out of balance condition for the wash machine as the basket 70 rotates within the wash tub 64. The wash basket 70 could also include a balance ring 96 located at a lower circumferential surface of the wash basket 70.

A dampening suspension system generally operates to dampen dynamic motion as the wash basket 70 rotates within the tub 64. The dampening suspension system has various natural operating frequencies of the dynamic system. These natural operating frequencies are referred to as the modes of suspension for the washing machine. For instance, the first mode of suspension for the washing machine occurs when the dynamic system including the wash basket 70, tub 64, and suspension system are operating at the first resonant or natural frequency of the dynamic system.

Operation of washing machine appliance 50 is controlled by a controller 150 which is operatively coupled to the user interface input located on washing machine backsplash 56 (shown in FIG. 1) for user manipulation to select washing machine cycles and features. In response to user manipulation of the user interface input, controller 150 operates the various components of washing machine appliance 50 to execute selected machine cycles and features.

Controller 150 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 150 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 58 and other components of washing machine appliance 50 (such as motor assembly 148 and measurement devices 130 (discussed herein)) may be in communication with controller 150 via one or more signal lines or shared communication busses to provide signals to and/or receive signals from the controller 150.

In an illustrative embodiment, laundry items are loaded into basket 70, and washing operation is initiated through operator manipulation of control input selectors 60 (shown in FIG. 1). Tub 64 is filled with liquid such as water and mixed with detergent to form a wash fluid, and basket 70 is agitated with agitation element 116 for cleansing of laundry items in basket 70. That is, agitation element is moved back and forth in an oscillatory back and forth motion, while basket 70 remains generally stationary (i.e. not actively rotated). In the illustrated embodiment, agitation element 116 is rotated clockwise a specified amount about the vertical axis of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitation element 116 during the strokes imparts mechanical energy to articles in basket 70 for cleansing action. The strokes may be obtained in different embodiments with a reversing motor, a reversible clutch, or other known reciprocating mechanism. After the agitation phase of the wash cycle is completed, tub 64 is drained with pump assembly 72. Laundry articles can then be rinsed by again adding liquid to tub 64. Depending on the particulars of the cleaning cycle selected by a user, agitation element 116 may again provide agitation within basket 70. After a rinse cycle, tub 64 is again drained, such as through use of pump assembly 72. After liquid is drained from tub 64, one or more spin cycles may be performed. In particular, a spin cycle may be applied after the agitation phase and/or after the rinse phase in order to wring excess wash fluid from the articles being washed. During a spin cycle, basket 70 is rotated at relatively high speeds, such as between approximately 450 and approximately 1300 revolutions per minute.

While described in the context of specific embodiments of washing machine appliance 50, using the teachings disclosed herein it will be understood that washing machine appliance 50 is provided by way of example only. Other washing machine appliances having different configurations (such as vertical-axis washing machine appliances with different suspension assemblies 92), different appearances, and/or different features may also be utilized with the present subject matter as well.

Referring now to FIG. 4, one or more measurement devices 130 may be provided in the washing machine appliance 50 for measuring movement of the tub 64, in particular during agitation of articles in the agitation phase of the wash cycle. Measurement devices 130 may measure a variety of suitable variables which can be correlated to movement of the tub 64. The movement measured by such devices 130 can be utilized to monitor the load balance state of the tub 64, in particular during agitation of articles in the agitation phase, and to facilitate agitation in particular manners and/or for particular time periods to adjust the load balance state, i.e. to attempt to balance articles within the basket 70.

A measurement device 130 in accordance with the present disclosure may be an accelerometer which measures translational motion, such as acceleration along one or more directions. Additionally or alternatively, a measurement device 130 may be or include a gyroscope which measures rotational motion, such as rotational velocity about an axis. A measurement device 130 in accordance with the present disclosure is mounted to the tub 64 (i.e. bottom wall 66 or a sidewall 68 thereof) to sense movement of the tub 64 relative to the cabinet 52 by measuring periodic and/or non-periodic motion of the tub 64 during appliance 50 operation.

In exemplary embodiments as shown, a measurement device 130 may include a gyroscope and/or an accelerometer (which may be a first accelerometer). The measurement device 130 may further include a second accelerometer and/or second gyroscope. The measurement device 130, for example, may be a printed circuit board which includes the gyroscope(s) and accelerometer(s) thereon. The measurement device 130 may be mounted to the tub 64 (i.e. via a suitable mechanical fastener, adhesive, etc.) and may be oriented such that the various sub-components (i.e. the gyroscope(s) and accelerometer(s)) are oriented to measure movement along or about particular directions as discussed herein. Notably, the gyroscope(s) and accelerometer(s) in exemplary embodiments are advantageously mounted to the tub 64 at a single location (i.e. the location of the printed circuit board or other component of the measurement device 130 on which the gyroscope(s) and accelerometer(s) are grouped). Such positioning at a single location advantageously reduces the costs and complexity (i.e. due to additional wiring, etc.) of out-of-balance detection, while still providing relatively accurate out-of-balance detection as discussed herein. Alternatively, however, the gyroscope(s) and accelerometer(s) need not be mounted at a single location. For example, a gyroscope located at one location on tub 64 can measure the rotation of an accelerometer located at a different location on tub 64, because rotation about a given axis is the same everywhere on a solid object such as tub 64.

As illustrated in FIGS. 3 and 4, tub 64 may define an X-axis, a Y-axis and a Z-axis which are mutually orthogonal to each other. The Z-axis may extend along a longitudinal direction, and may thus be coaxial with the vertical axis 118 when the tub 64 and basket 70 are balanced. The Z-axis may additionally be a central axis, defining the center C of the tub 64 in planes defined by the X-axis and Y-axis (as illustrated for example in FIG. 4). Movement of the tub 64 measured by measurement devices 130 (such as a directional component of such movement) may, in exemplary embodiments, be measured along a direction perpendicular or approximately perpendicular to a vector that passes through a center C of the tub 64. Such movement may, for example, be measured in a plane defined by the X-axis and Y-axis. Additionally or alternatively, movement of the tub 64 measured by measurement devices 130 (such as a directional component of such movement) may, in exemplary embodiments, be measured along or approximately along a vector that passes through a center C of the tub 64. Such movement may, for example, be measured in a plane defined by the X-axis and Y-axis.

In some embodiments, for example, movement of the tub 64 may be measured both along or approximately along a direction perpendicular to a vector that passes through a center C of the tub 64 and along or approximately along a vector that passes through a center C of the tub 64. For example, movement may be measured along the X-axis and the Y-axis at locations that are respectively along or approximately along and perpendicular or approximately perpendicular to such vectors, or along the X-axis and the Y-axis at locations that are perpendicular or approximately perpendicular to such vectors, or along the X-axis and Y-axis at locations that are along or approximately along such vectors. Such movement may, for example, be measured in a plane defined by the X-axis and Y-axis. Notably, the plane in which movement is being measured may be coincident with or offset from the plane in which movement of the tub 64 is calculated, as discussed herein.

In exemplary embodiments in accordance with the present disclosure, gyroscope(s) and accelerometer(s) are provided at a single location. Alternatively, however, the various gyroscope(s) and accelerometer(s) may be located at different locations. A gyroscope, such as the first gyroscope, may be positioned to measure movement about an axis (i.e. rotational movement), such as about the Z-axis as illustrated. The second gyroscope may be positioned to measure movement about another, different axis, such as the X-axis or Y-axis. Each accelerometer may be positioned to measurement movement along another axis, such as the X-axis or the Y-axis as shown. For example, the first accelerometer may measure movement along the Y-axis. Further, in exemplary embodiments as shown, the movement measured by the first accelerometer may be measured along a direction that is perpendicular to a vector that passes through the center C of the tub 64 from measurement device 130. The second accelerometer may measure movement along an axis other than that about which the gyroscope is measuring and along which the first accelerometer is measuring. For example, the second accelerometer may measure movement along the X-axis. Further, in exemplary embodiments as shown, the movement measured by the second accelerometer may be measured along a vector that passes through the center C of the tub 64.

The measured movement of the tub 64 in accordance with exemplary embodiments of the present disclosure, such as those requiring one or more gyroscopes and one or more accelerometers, may advantageously be calculated based on the movement components measured by these components of the measurement device 130. For example, movement of the tub 64 along an axis wherein an accelerometer is measuring a component of movement along a direction that is perpendicular to a vector that passes through the center C of the tub 64 may be calculated using the component of movement measured by that accelerometer as well as the movement component measured by the gyroscope. Specifically, in exemplary embodiments movement measured by a gyroscope and accelerometer may together be utilized to calculate motion at an offset distance, which may for example be an offset distance 132 in an X-Y plane from measurement device 130 to a center C and/or an offset distance 133 along the Z-axis from measurement device 130 to a center C'.

In one embodiment, movement of the tub 64 at center C along the Y-axis may be measured based on the movement measured by the first accelerometer, the movement measured by the gyroscope about the Z-axis, and an offset distance 132 between the center C and the first accelerometer along the vector axis. The calculation may be represented by a displacement resultant of a cross-product added to a displacement. Specifically, the calculation may be represented by a Y-axis displacement resultant of a cross-product (i.e. rotation about Z times offset 132) added to the Y-axis displacement at sensor 130 with the result of this calculation being the displacement of the center C in the direction of the Y-axis.

In another embodiment, movement of the tub 64 at C' (see FIG. 3) along the X-axis may be measured based on the movement measured by the second accelerometer, the movement measured by the gyroscope about the Y-axis, and an offset distance 133 along the Z-axis between the tub movement measurement location (i.e. location of measurement device 130) and the location of C' for which movement is being measured. The calculation may be represented by a X-axis displacement resultant of a cross-product (i.e. rotation about Y times Z offset 133) added to the X-axis displacement i.e. at a measurement device 130, such as at the second accelerometer, with the result of this calculation being the displacement of the center C' in the direction of the X-axis in an X-Y plane that is offset from the plane of the measurement device by the offset distance 133.

Accordingly, movement of the tub 64 along one axis (for example, the Y-axis) at a center C of the tub 64 may be indirectly measured. Movement along another axis (for example, the X-axis) may similarly be indirectly measured or may be directly measured, such as by the second accelerometer alone. Movement of the tub 64 within a plane (i.e. the X-Y plane) can thus advantageously be measured at a single location via the use of suitable sensors which provide both direct and indirect measurements.

Further, and as discussed, the measurement device 130 need not be in the X-Y plane in which movement (i.e. at the center) is calculated. For example, measurement device 130 may additionally be offset by an offset distance along the Z-axis. In one particular example, a measurement device 130 mounted to or proximate the bottom wall 66 may be utilized to indirectly measure movement of the center C in an X-Y plane at or proximate the top of the tub 64.

Notably, the term approximately as utilized with regard to such movement measurements denotes ranges such as of plus or minus 2 inches and/or plus or minus 10 degrees relative to various axes passing through the basket center which minimizes the contribution to the measurement result of rotation about the Z-axis as might be caused for example by a torque reaction to motor 120.

Referring now to FIGS. 3 through 6, various methods may be provided for use with washing machine appliances 50 in accordance with the present disclosure. In general, the various steps of methods as disclosed herein may in exemplary embodiments be performed by the controller 150, which may receive inputs and transmit outputs from various other components of the appliance 50. In particular, the present disclosure is further directed to methods, as indicated by reference number 200, for operating washing machine appliances 50. Such methods advantageously facilitate monitoring of load balance states, detection of out-of-balance conditions, and reduction of out-of-balance conditions when detected. In exemplary embodiments, such balancing is performed during the agitation phase, before draining and subsequent rinse cycles, spin cycles, etc.

A method 200 may, for example, include the step 210 of flowing a volume of liquid into the tub 64. The liquid may include water, and may further include one or more additives as discussed above. The water may be flowed through hoses 106, 108, tube 110 and nozzle assembly 112 into the tub 64 and onto articles which are disposed in the basket 70 for washing. The volume of liquid is dependent upon the size of the load of articles and other variables which may, for example, be input by a user interacting with control panel 58 and input selectors 60 thereof.

Method 200 may further include, for example, the step 220 of agitating articles within the tub 64 (i.e. disposed within the basket 70) for a first period. Agitating may be performed by agitation element 116 as discussed herein. During such agitation (which is a sub-phase of the agitation phase), the volume of liquid flowed into the tub 64 in step 210 remains in the tub 64 (i.e. no drainage of liquid may occur between steps 210 and 220). The first period is a defined period of time programmed into the controller 150, and the first period and the rate and pattern of agitation during the first period may be dependent upon the size of the load of articles and other variables which may, for example, be input by a user interacting with control panel 58 and input selectors 60 thereof.

Method 200 may further include, for example, the step 230 of measuring movement of the tub 64 during agitation of the articles within the tub 64. During such measurement, the volume of liquid flowed into the tub 64 in step 210 remains in the tub 64 (i.e. no drainage of liquid may occur between steps 210 and 230). Such measurement of movement may occur for a defined period of time programmed into the controller 150. Measurement may be performed by a single measurement device 130 at a single location and which includes one or more gyroscopes and one or more accelerometers, or by multiple measurement devices 130 at multiple locations and each of which includes one or more gyroscopes and/or one or more accelerometers, as discussed herein.

In some embodiments, such measurement 230 may occur during step 220 of agitating articles within the tub 64 for the first period. Alternatively, such measurement 230 may occur separately and after step 220 (such as directly after with no intervening steps other than a possible pause in agitation). In these embodiments, such measurement 230 may occur for an intermediate measurement period. The intermediate measurement period is a defined period of time programmed into the controller 150, and the intermediate measurement period and the rate and pattern of agitation during the intermediate measurement period may be dependent upon the size of the load of articles and other variables which may, for example, be input by a user interacting with control panel 58 and input selectors 60 thereof.

Measurement in accordance with step 230 may result in measured movements of the tub 64 (during the first period or during the intermediate measurement period) being recorded and, for example, transmitted to controller 150. These measurement movements may be utilized to determine if the load of articles, and thus the basket 70 and tub 64, are out-of-balance. Accordingly, an out-of-balance movement threshold may be defined, and may for example be programmed into the controller 150. Measured movement above the threshold may indicate that the present load of articles is out-of-balance, while measured movement below the threshold may indicate sufficient balance of the load of articles.

The out-of-balance movement threshold may include directly or indirectly measured movement components along and/or about one or more directions, such as along the X-axis and/or along the Y-axis, or the instantaneous movement represented by the vector summation of orthogonal components such as X and Y. The usual vector summation is expressed as $(X^2+Y^2)^{(1/2)}$ but any other form of vectorial representation such as $Vector^2=(X^2+Y^2)$ can be used. Measured movement above or below the threshold may be defined as one or more movement components or a vector summation exceeding or not exceeding the component threshold. For example, the value compared to a threshold may be determined by a calculation using any combination of X and or Y that involves their change in value such as a difference between sequential minimum and maximum values derived from a representation of the motion's waveform.

Notably, in some embodiments, methods 200 in accordance with the present disclosure facilitate "preferential stopping" of the agitation phase when, for example the measured movement is below the out-of-balance movement threshold and thus the load is indicated as being sufficiently balanced. Accordingly, in some embodiments during the measuring movement step 230, agitating of the articles may be actively ceased upon determination that the measured movement is less than the out-of-balance movement threshold. Such active ceasing may occur during the first period or during the intermediate period, and may for example occur after a predetermined sub-period of agitation during which agitation occurs regardless of whether the measured movement is above or below the out-of-balance movement. Active ceasing thus actively discontinues the measuring movement step 230 (such as via a signal from the controller 150) before the defined period for measuring movement expires, and allows the wash cycle to continue to subsequent steps that occur after the agitation phase (i.e. draining, rinsing and/or spinning).

Movement of the tub 64 may be measured for a defined period (which may for example be a component of the first period or intermediate measurement period as discussed above). The measured movements may be compared to the out-of-balance movement threshold. When a final measured movement is greater than the out-of-balance threshold, further agitation of the articles may occur in an effort to redistribute the articles to balance the load. For example, method 200 may include the step 240 of agitating articles within the tub 64 (i.e. disposed within the basket 70) for a second period. Agitating may be performed by agitation element 116 as discussed herein. During such agitation (which is a sub-phase of the agitation phase), the volume of liquid flowed into the tub 64 in step 210 remains in the tub 64 (i.e. no drainage of liquid may occur between steps 210 and 240). The second period is a defined period of time programmed into the controller 150, and the second period and the rate and pattern of agitation during the second period may be dependent upon the size of the load of articles and other variables which may, for example, be input by a user interacting with control panel 58 and input selectors 60 thereof. Notably, the second period and the rate and pattern of agitation may be particularly defined to facilitate redistribution of articles in an effort to balance the load of articles.

When a final measured movement is, on the other hand, less than the out-of-balance threshold (or when agitating is actively ceased as discussed above), the wash cycle may proceed from the agitation phase to other phases of the wash cycle (i.e. draining, rinsing and/or spinning). For example, method 200 may further include the step 250 of draining liquid from the tub 64 (as discussed herein) when the final measured movement is less than the out-of-balance movement threshold (or when agitating is actively ceased as discussed above). Method 200 may further include the step 260 of spinning the basket 70 (as discussed herein) after step 250 of draining liquid from the tub 64. Additional intermediate rinsing and draining steps may additionally be provided, as desired or required for a particular wash cycle.

It should be noted that the various steps as disclosed herein may be repeated as desired or required in order to facilitate load balancing during a wash cycle.

Monitoring of movement of the tub 64 is not limited in accordance with the present disclosure to monitoring during the agitation phase as discussed above. For example, such monitoring may be utilized during any suitable portion of the wash cycle, including the agitation phase, a rinse phase, and/or a spin phase, to monitor movement of the tub 64. Such movement monitoring may be continuous or periodic during a specified phase to ensure that movement of the tub 64 does not exceed a specified movement threshold.

In exemplary embodiments, when movement of tub 64 exceeds a predetermined threshold, the washing machine appliance 50 may alter one or more characteristics of the ongoing phase of the wash cycle (i.e. rotational speed, acceleration, etc.) or otherwise adjust washing operation (i.e. via additional agitation as discussed herein) to reduce the movement of the tub 64. When movement of tub 64 does not exceed the predetermined threshold, the washing machine appliance 50 may continue with the ongoing phase without any adjustments.

Accordingly, and referring now to FIG. 6, a method 200 in accordance with the present disclosure may include, for example, the step 300 of performing a wash cycle. The wash cycle may include flowing a volume of liquid into the tub, agitating articles within the tub, draining liquid from the tub after agitating the articles, and spinning the basket after draining liquid from the tub, as discussed herein. The method 200 may further include, for example, the step 310 of measuring movement of the tub during the wash cycle, as discussed herein. The movement may be measured using one or more accelerometers and one or more gyroscopes, as discussed herein. The method 200 may further include, for example, the step 320 of altering a characteristic of the wash cycle when a final measured movement is greater than a movement threshold, as discussed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a washing machine appliance, the washing machine appliance having a tub and a basket rotatably mounted within the tub, the basket defining a chamber for receipt of articles for washing, the method comprising:
   flowing a volume of liquid into the tub;
   agitating articles within the tub for a first period, the tub containing the volume of liquid;
   measuring movement of the tub during agitation of the articles within the tub, the tub containing the volume of liquid, wherein the movement is measured using an accelerometer and a gyroscope;
   agitating articles within the tub for a second period when the final measured movement is greater than an out-of-balance movement threshold, the tub containing the volume of liquid;
   draining liquid from the tub when the final measured movement is less than the out-of-balance movement threshold; and
   spinning the basket after draining liquid from the tub,
   wherein agitating articles within the tub comprises redistributing the articles during a tumbling cycle within the tub through a repeated starting-stopping pattern of agitation strokes according to a corresponding agitation profile prior to the step of draining liquid from the tub.

2. The method of claim 1, wherein the tub defines an X-axis, a Y-axis and a Z-axis which are mutually orthogonal to each other, the Z-axis extending along a longitudinal direction and defining a center of the tub, and wherein the gyroscope measures movement about the Z-axis.

3. The method of claim 2, wherein the accelerometer measures movement along the Y-axis.

4. The method of claim 3, wherein the movement measured by the accelerometer is measured along a direction perpendicular to a vector that passes through the center.

5. The method of claim 1, wherein the accelerometer is a first accelerometer, and further comprising a second accelerometer mounted to the tub.

6. The method of claim 5, wherein the second accelerometer measures movement along the X-axis.

7. The method of claim 1, wherein the step of measuring movement occurs after agitating articles within the tub for the first period and for an intermediate measurement period.

8. The method of claim 1, wherein the step of measuring movement occurs during agitating articles within the tub for the first period.

9. The method of claim 1, wherein, during the step of measuring movement, agitating of the articles is actively ceased upon determination that the measured movement is less than the out-of-balance movement threshold.

10. A washing machine appliance, comprising:
    a tub;
    a basket rotatably mounted within the tub, the basket defining a wash chamber for receipt of articles for washing;
    a valve;
    a nozzle configured for flowing liquid from the valve into the tub;
    an agitation element;

a motor in mechanical communication with the basket, the motor configured for selectively rotating the basket within the tub and further configured for selectively rotating the agitation element;

a gyroscope mounted to the tub;

an accelerometer mounted to the tub; and a controller in operative communication with the valve, motor, gyroscope and accelerometer, the controller configured for:

flowing a volume of liquid into the tub;

agitating articles within the tub for a first period, the tub containing the volume of liquid;

measuring movement of the tub during agitation of the articles within the tub, the tub containing the volume of liquid, wherein the movement is measured using the accelerometer and the gyroscope;

agitating articles within the tub for a second period when the final measured movement is greater than an out-of-balance movement threshold, the tub containing the volume of liquid;

draining liquid from the tub when the final measured movement is less than the out-of-balance movement threshold; and spinning the basket after draining liquid from the tub, wherein agitating articles within the tub comprises redistributing the articles during a tumbling cycle within the tub through a repeated starting-stopping pattern of agitation strokes according to a corresponding agitation profile prior to the step of draining liquid from the tub.

11. The washing machine appliance of claim 10, wherein the tub defines an X-axis, a Y-axis and a Z-axis which are mutually orthogonal to each other, the Z-axis extending along a longitudinal direction and defining a center of the tub, and wherein the gyroscope measures movement about the Z-axis.

12. The washing machine appliance of claim 11, wherein the accelerometer measures movement along the Y-axis.

13. The washing machine appliance of claim 12, wherein the movement measured by the accelerometer is measured along a direction perpendicular to a vector that passes through the center.

14. The washing machine appliance of claim 10, wherein the accelerometer is a first accelerometer, and further comprising a second accelerometer mounted to the tub.

15. The washing machine appliance of claim 14, wherein the second accelerometer measures movement along the X-axis.

16. The washing machine appliance of claim 10, wherein the step of measuring movement occurs after agitating articles within the tub for the first period and for an intermediate measurement period.

17. The washing machine appliance of claim 10, wherein the step of measuring movement occurs during agitating articles within the tub for the first period.

18. The washing machine appliance of claim 10, wherein, during the step of measuring movement, agitating of the articles is actively ceased upon determination that the measured movement is less than the out-of-balance movement threshold.

19. A method for operating a washing machine appliance, the washing machine appliance having a tub and a basket rotatably mounted within the tub, the basket defining a chamber for receipt of articles for washing, the method comprising:

performing a wash cycle, the wash cycle comprising flowing a volume of liquid into the tub, agitating articles within the tub, draining liquid from the tub after agitating the articles, and spinning the basket after draining liquid from the tub;

measuring movement of the tub during the wash cycle, wherein the movement is measured using an accelerometer and a gyroscope, the measuring comprising calculating motion at a point offset from the accelerometer and the gyroscope based on movement measured at the accelerometer and the gyroscope; and altering a characteristic of the wash cycle when a final measured movement is greater than a movement threshold.

* * * * *